United States Patent [19]

Saleeb et al.

[11] Patent Number: 4,532,145

[45] Date of Patent: Jul. 30, 1985

[54] FIXING VOLATILES IN AN AMORPHOUS SUBSTRATE AND PRODUCTS THEREFROM

[75] Inventors: Fouad Z. Saleeb, Pleasantville; John G. Pickup, Peekskill, both of N.Y.

[73] Assignee: General Foods Corporation, White Plains, N.Y.

[21] Appl. No.: 562,666

[22] Filed: Dec. 19, 1983

[51] Int. Cl.$^3$ .................... A23L 1/221; A23L 1/226
[52] U.S. Cl. ...................... 426/650; 426/96; 426/651
[58] Field of Search .................. 426/96, 650, 651

[56] References Cited

U.S. PATENT DOCUMENTS

| | | | |
|---|---|---|---|
| 3,554,768 | 1/1971 | Feldman | 426/650 X |
| 3,625,709 | 12/1971 | Mitchell | 426/650 X |
| 3,736,149 | 5/1979 | Knapp | 426/96 |
| 3,971,852 | 7/1976 | Brenner et al. | 426/650 X |
| 4,113,509 | 9/1978 | Leach et al. | 426/96 X |
| 4,271,202 | 6/1981 | Giel | 426/96 |
| 4,276,312 | 6/1981 | Merritt | 426/96 |

*Primary Examiner*—Joseph Golian
*Attorney, Agent, or Firm*—Thomas R. Savoie; Thomas A. Marcoux; Daniel J. Donovan

[57] ABSTRACT

A method for producing a moisture-stable product is elucidated, said process includes: admixing a low molecular weight water-soluble material (e.g., monosaccharides or disaccharides) having a molecular weight of from 90 to 500 molecular weight and a melting point of from 80° C. to 180° C., with a high molecular weight water-soluble polymeric material (e.g., polysaccharides) having a molecular weight of from 1,000–6,000. in an aqueous solution, adding a volatile flavorant (e.g., acetaldehyde) to said solution, and spray drying said solution within a temperature range of from 100° C. to 180° C. as an inlet temperature of 50° C. to 80° C. as an outlet temperature range.

6 Claims, No Drawings

FIXING VOLATILES IN AN AMORPHOUS SUBSTRATE AND PRODUCTS THEREFROM

BACKGROUND OF THE INVENTION

TECHNICAL FIELD

The present invention relates to a method for fixing volatile substances, and more particularly to a method for fixing a volatile substance in an amorphous substrate and the products derived therefrom.

In the quest for giving the consumer a fresher tasting reconstitutable beverage mix, it has been found that certain natural or synthetic volatile compounds, improve the consumer's taste perception thereof. Unlike liquid systems, systems which can be loaded with volatile flavorants without adverse stability problems, it is within a dry comestible mix like convenience-beverage mixes, that the instilling of flavor enhances to increase the consumer's perception of freshness is of paramount importance.

Such compounds as coffee aroma, esters, acetaldehyde, various essential oils, and sulphur compounds, augment or enhance the taste perception of convenience foods. Dry comestible mix systems as stated hereinabove, present special problems when one tries to introduce volatile or aromatic flavorants therein. For example, such flavor enhancers as acetaldehyde escape through and from the mix, or react so as to degrade into compounds which are recognized to be less desirable. Therefore, there has been a longstanding need to, reversibly fix by encapsulation, and prevent the escape of, a volatile within a "powdered-mix" comestible. Moreover, the method for fixing a volatile must produce a product which is easily reconstitutable and is capable of holding the fix over prolonged periods and under adverse storage conditions.

A major problem inherent in fixing aromatics in food acceptable substrates is the fact that those fixation substrates display idiosyncratic fixation characteristics. The substrate media may be sensitive to moisture, react with the entrained volatile or produce off-notes of flavor. Carbohydrates as a class offer a food-acceptable substrate wherein volatiles and aromatics have been fixed. However, most water-soluble carbohydrate substrates are hygroscopic and will not reliably hold the fix for long periods. In view of the foregoing, there is a recognized need for a moisture-stable, water-soluble food-approved substrate to encapsulate aromatic or volatile favorants.

PRIOR ART

There have been many attempts to fix volatiles and aromatics. The most notable attempts to create such dry products are outlined hereinbelow. U.S. Pat. No. 2,856,291 issued to Schultz discloses a method for incorporating a volatile flavoring substance in a sugar substrate. He accomplishes this by preparing an emulsion of the sugar, flavor oil and water, and he blends said components to form an emulsion. Among the flavoring materials which he uses are flavor oils, such as orange oil and lemon oil and synthetic agents such as aldehydes, alcohols, esters, and other volatile agents. Among the aldehydes that he lists are decanal and cinnamaldehyde.

U.S. Pat. No. 3,314,803 issued to Dame, et al., provides a method for fixing a volatile flavor such as acetaldehyde in a mannitol substrate. The acetaldehyde is fixed in mannitol by first forming a solution of mannitol and water and preferably a supersaturated solution of mannitol of between 25%-45% by weight. The supersaturated solution is formed by heating with agitation 2 to 10 parts by weight of mannitol with 10 parts by weight of water at 180°-212° F. until all of the mannitol is dissolved in the water and no mannitol crystals remain in the solution. The solution is then cooled while acetaldehyde is added thereto. A controlled reflux admixes the volatile. The reference solution is then spray-dried.

U.S. Pat. No. 3,554,768 issued to Feldman, provides a method for fixing acetaldehyde in selected carbohydrates, said method relying on a carbohydrate substance and acetaldehyde, said substances being uniformly mixed in water and the resulting mixture being dried to form a flavor enhancing composition.

It should be noted that stability of the Feldman product is dependent on maintaining the product in a hermetically-sealed environment. It was found after producing samples according to the teachings of the above-identified patent, that the samples produced thereby were exquisitely sensitive to moisture. In fact, within 28 hours after exposure to ambient conditions, partial collapse of the product was noted. The extent of structural collapse over time was so extreme that the product "clumped" into a sticky, ball-like mass. In distinction, the present invention displays a marked tolerance to moisture, and will not cake when exposed to ambient conditions.

In the aforementioned prior art examples, the disadvantage of using the above-enumerated compounds or methodologies is the low fix obtained therefrom, or the moisture-lability of the resultant products. Stability of previously available products is in most cases dependent on a hermetically sealed product environment, which is kept free from ambient moisture levels.

Previously available fixation media display a great degree of crystallinity. Crystallinity appears to reduce the interstitial macro-molecular space wherein volatile flavorants may be entrapped and held. It has been found that with an increase in crystallinity there is a concomitant decrease in the ability of the substrate to "fix" volatiles. On the other hand, there are several classes of non-crystalline compounds which appear to be unsuitable fixation media. Gums and waxy starches, present "leaky" substrates, a substrate whose structure will not retain the entrapped acetaldehyde component over time.

SUMMARY OF THE INVENTION

According to the present invention the volatile or aromatic substance is fixed within an amorphous substrate consisting of an admixture of low molecular weight water-soluble material and high molecular weight water-soluble polymer. The amount of said low molecular weight material is from about 10% to 30% by dry weight of the admixture, with said high molecular weight polymeric material comprising not less than 70% thereof. The low molecular weight substance should be of a molecular weight of from 90 to 500 molecular weight, and the high molecular weight material of from 1,000 to 6,000 average molecular weight. The low molecular weight material is preferably crystalline with a melting point of between 80° C. and 180° C. The combination of high and low molecular weight materials is dissolved in an aqueous solution with the temperature being maintained at around 10°-90° C. In the case of a highly volatile substance like acetaldehyde, the solution is allowed to cool to about 20° C. The volatile or aromatic flavorant is then added to the solution, the solution being maintained at from 10° C. to 50° C. The solution is then spray-dried in an atmospheric spray-dryer wherein the inlet temperature is typically about 100° C. to 180° C. and the outlet temperature is from 50° C. to 80° C. with the resultant fixed product being moisture-stable and of a prolonged shelf life.

DETAILED DESCRIPTION

Set out hereinbelow is the preferred methodology for fixing volatile agents in an amorphous or "glassy" substrate, so that a moisture-stable product of an elevated fix results. The volatile agent will be described as an aldehyde-type agent (acetaldehyde, butyraldehyde) although essential oils (e.g. orange oil) and aromas (e.g. coffee aroma) may be operatively substituted.

The term high molecular weight water-soluble polymer includes such materials as malto-dextrin, a material possessing a predominate amount of polysaccharide. Typically, malto-dextrin has a D.E. (dextrose equivalents) of from 4 to 20 and is composed of varying numbers of monosaccharides, dissaccharides and larger saccharide units. For example, LO-DEX 5 and 15 (malto-dextrins manufactured by American Maize Products Company, 1100 Indianapolis Boulevard, Hammond, Ind.) contains less than 1% monosaccharides, less than 2% disaccharides and less than 2% trisaccharides for LO-DEX 5 and less than 3% monosaccharides, 2% disaccharides, and 2% trisaccharides for LO-DEX 15. In the malto-dextrins used herein (LO-DEX 5, 10, 15) the content of tetrasaccharides or higher member carbohydrates exceeds 93% by weight of the malto-dextrin. Low molecular weight water-soluble materials, for illustrative purposes of the present invention, are such crystalline materials as adipic acid, malic acid, citric acid, mannose, maltose or other mono or disaccharides having melting points of from 80° C. to 180° C. and combinations thereof.

The procedure of spray drying, for purposes of the present invention may be defined as follows. A solution of the product one wishes to form is prepared. The term solution is understood to mean mixtures of solutes and a solvents encompassing such mixtures as emulsions. The solution is fed into an atomizer which creates a fine mist, composed of regular-sized droplets. The misted-solution is introduced, usually through the top of a drying tower or chamber. Heated air is usually fed into the bottom of the chamber or the chamber is heated so that as the droplets fall from the top of the chamber evaporation of the liquid phase or drying occurs. The product is collected from an outlet port. Examples of spray drying apparatus are the Anhydro Dryers (manufactured by Anhydro Corp. of Brattleboro Falls, Mass.) or the Niro Dryer (manufactured by Niro Atomizer Ltd., Copenhagen, Denmark).

It appears that the operative principle, which characterizes the instant invention, is the maximization of the inherent fixative qualities of high molecular weight materials. For example, it has been found that a malto-dextrin (D.E. 10) enables one to obtain a 4.6% fix. The problem inherent therein, is that although the fix is quite high, it is ephemeral, and rapidly dissipates. This fixative material is structurally weak and the volatile "leaks" through the inadequate infra-structure.

A solution to the problem of how to optimize the inherent fixative properties of polysaccharides or other higher molecular weight materials, is by way of combining the high molecular weight material with a second selected material to increase the structural integrity of the structurally weak high molecular weight material, giving unexpectedly dense substrate which is relatively non-hygroscopic. It appears that although small amounts of low molecular weight materials beneficially affect the fixation qualities of such high molecular weight materials as malto-dextrins, a minimum amount of the low molecular weight material is necessary. The minimum amount may be defined as the amount necessary to make the substrate truly amorphous, that is, a substrate without even a partially crystalline substructure. For example, in the present invention, it appears that the low molecular weight material should comprise from 10% to 30% of the combination of low and high molecular weight materials. More preferably, it has been found that about 20% low molecular weight material provides the optimum amount to the combination. As illustrated hereinbelow, a ratio of less than 30% low molecular weight material and at least 70% of high molecular weight material yields a spray-dried substrate capable of entrapping volatiles in an essentially non-hygroscopic "glossy" (amorphous) substrate for prolonged periods.

Set out hereinbelow are ten examples (1–10) of the instant process outlining the methodology proposed therein. The examples are merely for illustrative purposes and are not designed to in any way limit the instant invention.

EXAMPLE 1

An aqueous solution of maltose (monohydrate) of a molecular weight (M.W.) of 342 and a melting point 102° C. was prepared by dissolving 60 g of maltose in 600 ml of water at 25° C. Upon complete solubilization of the maltose 240 g of LO-DEX 10 (maltodextrin) with an average molecular weight of 2600 was added, and the solution was heated to about 95° C. until the solution became clear. This solution was allowed to cool to about 30° C. To this solution 30 ml of acetaldehyde was added and the solution was kept at about 25° C. The mixture was dried in a NIRO Dryer, the drying temperatures ranging from an inlet temperature of 110°–165° C. to an outlet temperature of 75° C. The fix of acetaldehyde of the sample, was found to be 3.56% which was stable and non-hygroscopic; after 8 days at ambient an open beaker the fix stabilized at 3.07%.

EXAMPLE 2

An aqueous solution containing 240 grams of LO-DEX 10 (a malto-dextrin manufactured by American Maize Products Company, Hammond, Indiana) (a malto-dextrin of 10 D.E.), 60 grams of mannose and 300 grams of water was prepared. The aqueous mixture was heated to about 80° C. to accelerate dissolution of the maltodextrin. Upon clearing, the solution was cooled to ambient temperature; 23.6 grams of acetaldehyde were added thereto. The mannose-malto-dextrin-acetaldehyde solution was introduced into a Niro Dryer (see above). The spray drier was maintained with an inlet temperature of 115° C. and an outlet temperature of 75° C. The solution was atomized and dried within the spray-drying apparatus. A dry free flowing product was obtained from the spray drier; the powder was found to have an acetaldehyde fix of 3%. A ten gram sample was set out at ambient temperature and humidity in an open beaker. After 16 days the fix stabilized at around 2%, and the powder-like product remained free flowing.

EXAMPLE 3

An aqueous solution containing 85 grams of commercially produced spray dried instant coffee of an average weight of about 3,000 M.W. (at least 90% of the solids contained herein are from 1,000 to 5,000 M.W.) 15 grams of mannose and 200 mls. of water was prepared. The solution was maintained at 25° C. and 7.9 grams of acetaldehyde was added thereto. The solution was spray dried in accordance with Example I above. The acetaldehyde fix was initially found to be 0.99% on a dry weight basis, remaining at 0.93% after being exposed to ambient temperatures and humidities for three days; no caking was noted.

EXAMPLE 4

240 g of LO-DEX 10, 30 g of mannose and 30 g of maltose were dissolved in 600 ml water. The mixture was heated to 90° C. to accelerate the rate of dissolution. The clear solution was then cooled to 15° C. and 22 ml (17.3 g) acetaldehyde was added thereto followed by spray-drying (Niro, inlet 110° C., outlet 70° C.). A free-flowing powder was obtained with an initial acetaldehyde level of 3.5%. A sample was exposed for 4 days (open beaker at ambient temperatures and humidities), the acetaldehyde fix content was 3.34%. There was no observable signs of caking and the powder was free-flowing.

EXAMPLE 5

An aqueous solution of high maltose corn syrup having an average molecular weight of 430 M.W. and being further composed of 80.7% solids, (A. E. Staley Decatur, Ill.) was prepared by mixing 474 lbs. of syrup with 3487 lbs. water. Upon complete solubilization 1527 lbs. (of LO-DEX 10 of 2600 M.W.) was added and the solution was maintained at ambient temperature. The solution was maintained at about 22° C. and 91.6 lbs. of acetaldehyde was added, with the solution being kept at between 22°-25° C. The mixture was then dried in an Anhydro-Type Dryer An inlet temperature 132° C. and an outlet temperature of between 60°-75° C. was employed, the aldehyde fix was found to be 3.1%, and after 13 days at ambient, stabilized at 2.7%.

EXAMPLE 6

240 g of LO-DEX 10 and 60 g of citric acid were dissolved in 600 ml of water (80° C.). The clear aqueous solution was allowed to cool to room temperature and 18 g of diacetyl (a volatile flavorant) was added thereto. The solution was spray-dried wherein the inlet temperature was maintained at 110° C., and the outlet temperature was maintained at 55° C. On spray-drying a non-hygroscopic free-flowing powder was obtained with an initial diacetyl level of 2.91% (wt/wt). After storage for 3 days in an open container (ambient conditions) a diacetyl fix of 2.86% was measured with no signs of caking or loss of flowability.

EXAMPLE 7

240 g of LO-DEX 10 and 60 g of adipic acid were dissolved in 1150 ml of water. 18 g of diacetyl was mixed therein, and the solution was spray dried in a "Niro"-type dryer. The inlet air temperature was maintained at about 110° C. and the outlet air temperatures was maintained at about 73° C. Upon spray drying a free flowing powder was obtained with an initial diacetyl fix of 2.4%. After 8 days in an open beaker, the powder remained free flowing and retained a 1.44% diacetyl fix.

EXAMPLE 8

240 g of LO-DEX 10 and 60 g of malic acid were dissolved in 600 ml of water. To the solution, 18 g of diacetyl was added. The solution was spray dried in accordance with Example 7. An initial fix of 3.2% diacetyl was obtained and after 4 days under ambient conditions, the fix stabilized at about 2.2%.

EXAMPLE 9

Stability of Acetaldehyde in Maltose-Maltodextrin Mixtures

In all experiments reported in this example, LO-DEX 10 was used. According to manufacturer (Amaizo, see above) it contains approximately 1% monosaccharides and 4% disaccharides. The total monosaccharides and disaccharides are calculated on the following page.

The table of example 9 illustrates the relative stabilities of the asserted combination-type substrate, showing optimization of fix as related to stability in view of composition. As one can deduce from the table, an optimal combination is approached when the added disaccharide (maltose) is about 20% to about 30% by weight of the combination of the mixture of LO-DEX 10 and maltose.

| Sample | Maltose Added (Wt. %) | LO-DEX 10 Added (Wt. %) | Total Mono- and Disacch. (%) | Total Disacch. (%) | Acetald. Fix Initial | Acetald. Fix 5 Days | Product Performance |
|---|---|---|---|---|---|---|---|
| (1) | 0 | 100 | 5% | 4% | 4.6 | 1.2 | Not stable Low Density |
| (2) | 15 | 85 | 19.3 | 18.4 | 3.5 | 3.1 | Stable |
| (3) | 20 | 80 | 24.3 | 23.2 | 3.6 | 3.2 | v-stable, Dense |
| (4) | 25 | 75 | 28.8 | 28.0 | 4.7 | 3.8 | v-stable, Dense |
| (5) | 30 | 70 | 33.5 | 32.8 | 4.1 | 3.4 | Slightly caked after 5 days |
| (6) | 40 | 60 | 43.0 | 42.4 | 5.0 | 0.9 | Caked in 2 days |

EXAMPLE 10

CORRELATION OF HIGH MOLECULAR WEIGHT AND FIX

| Sample | Composition | Average Mol. Wt. of Polymer | Acetaldehyde Level Initial | Acetaldehyde Level 3 Days at Ambient |
|---|---|---|---|---|
| A | 30% Maltose 35% Lodex 10 35% Tapioca Dextrin (DE 1) (mfc. Staley Inc.) | 18,000 | 3.9% | .25% |
| B | 30% Maltose | 2,600 | 4.95% | 4.18% |

-continued

CORRELATION OF HIGH MOLECULAR WEIGHT AND FIX

| Sample | Composition | Average Mol. Wt. of Polymer | Acetaldehyde Level Initial | Acetaldehyde Level 3 Days at Ambient |
|---|---|---|---|---|
| C | 70% Lodex 10<br>30% Maltose | 4,000 | 4.19% | 3.2% |
| D | 70% Malto-dextrin with a D.E. of 5<br>25% Saccharin | 40,000 | 1.3% | .07% |
| E | 75% Polyvinylpyrrolidone<br>30% Mannitol | 10,000 | 2.2% | .07% |
| | 70% Capsul (Modified Starch) | | | |

As stated hereinabove, it appears that the molecular weight of the high molecular weight component is critical to the fixative qualities of the substrate as a whole. Where average molecular weights of food-approved components approaches 10,000, the substrate becomes "leaky." The substrate is composed of interstitial spaces which are unable to retain sufficient integrity to retain the volatile component entrapped therein. It appears that an increase in molecular weight exceeding a molecular weight of 6,000 results in a more fibrous less dense, with a concomitant inability to retain a deposited volatile substance. Such high molecular weight materials, which do not adequately retain highly volatile components are polyvinylpyrrolidone M.W. 10,000–360,000, tapioca dextrins M.W. 10,000 and arabinogalactan M.W. 70,000–90,000. Therefore, for purposes of the present fixation methodology a molecular weight of from 1,000 to 6,000 molecular weight is desirable. This weight allows for a high fix to be deposited, with little resultant loss.

Spray drying appears to be the method of choice in the present invention. Other drying techniques compromise the integrity of either the structure of the substrate or the presence of the volatile flavorant. Freeze-drying results in a product with a porous substrate from which a volatile would easily escape. Drum drying requires maintaining fairly high temperatures for prolonged periods of time during which volatile flavorant loss from volatilization or degradation can occur. Spray drying yields a substrate of higher density and appears to have the least deleterious effect on the volatile flavorant.

Therefore, while the present invention is drawn to mainly food acceptable carbohydrates it is understood that other materials may be substituted within the spirit and scope of the claims.

What is claimed is:

1. A process for producing a moisture-stable, fixed acetaldehyde composition having an amorphous substrate comprising the steps of:

(a) forming an aqueous solution which consists of on a solids basis from 10 to 30% by weight of a water-soluble, crystalline, low molecular weight material which has a molecular weight of from 90 to 500 and a melting point of from 80° to 180° C. and no less than 70% by weight of a water-soluble, malto-dextrin having a D.E. of from 4 to 20 and an average molecular weight of from 1,000 to 6,000;

(b) incorporating acetaldehyde into the solution of step (a) and thereafter;

(c) spray-drying the aqueous solution.

2. A process according to claim 1 wherein the low molecular weight material is selected from the group consisting of malic acid, citric acid, adipic acid, monosaccharides, disaccharides and combinations thereof.

3. A spray-dried, moisture-stable fixed acetaldehyde composition comprising:

(a) an amorphous substrate consisting of from 10% to 30% of a water-soluble, crystalline, low molecular weight material which has molecular weight of from 90 to 500 and a melting point of from 80° to 180° C. and no less than 70% by weight of a water-soluble malto-dextrin having a D.E. of from 4 to 20 and an average molecular weight of from 1,000 to 6,000; and (b) acetaldehyde fixed within the amorphous substrate.

4. A fixed acetaldehyde composition according to claim 3 wherein said low molecular weight material is selected from the group consisting of adipic acid, citric acid, malic acid, monosaccharides, disaccharides and combinations thereof.

5. A fixed acetaldehyde composition according to claim 3 wherein said low molecular weight material is selected from the group consisting of maltose, high maltose corn syrup solids, mannose and combinations thereof.

6. A fixed acetaldehyde composition according to claim 5 wherein the low-molecular weight material is present in the substrate at a level of about 20%.

* * * * *